United States Patent [19]

Malcolm

[11] 3,779,576
[45] Dec. 18, 1973

[54] SUSPENSION SYSTEMS
[76] Inventor: George D. Malcolm, 5 James St., Mangere East, Auckland, New Zealand
[22] Filed: Oct. 14, 1971
[21] Appl. No.: 189,180

[30] Foreign Application Priority Data
Oct. 15, 1970 New Zealand.................161732
Mar. 31, 1971 New Zealand.................163250

[52] U.S. Cl........ 280/124 B, 267/57.1 A, 267/63 A
[51] Int. Cl............................................ B60g 11/60
[58] Field of Search .................... 280/124 B, 124 R, 280/124 F; 267/21 R, 57.1 R, 57.1 A, 63 R, 63 A

[56] References Cited
UNITED STATES PATENTS
3,494,609 2/1970 Harbers........................... 280/124 R
3,436,069 4/1969 Henschen....................... 280/124 R
2,861,796 11/1958 Rohr................................. 267/21 R
2,729,442 1/1956 Neidhart......................... 267/21 R Primary Examiner—Philip Goodman
Assistant Examiner—John A. Carroll
Attorney—Richard K. Stevens et al.

[57] ABSTRACT

A trailed vehicle has at least one beam axle (but perhaps two with or without load sharing coupling) with the wheels independently suspended on leading or trailing arm members. The axle is mounted to the chassis or body so that in bump or positive roll conditions when a wheel on one side and the body or chassis move closer together, the axle moves forwardly at that side resulting in the steering of the wheels in a direction to counter the effects of the displacing force acting on the trailed vehicle and thus undesirable effects exerted by the trailed vehicle on the towing vehicle. A "bolt-on" suspension unit has a torsionally resilient beam axle, a primary torsion suspension for the arm members and a secondary suspension allowing forward movement of either side of the axle about one of a pair of transversely aligned pivots in reaction to torque imposed on that side of the axle under bump or positive roll conditions.

17 Claims, 11 Drawing Figures

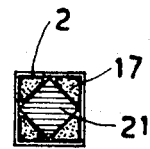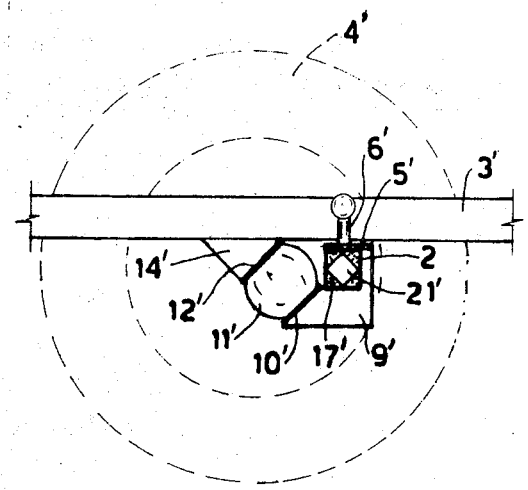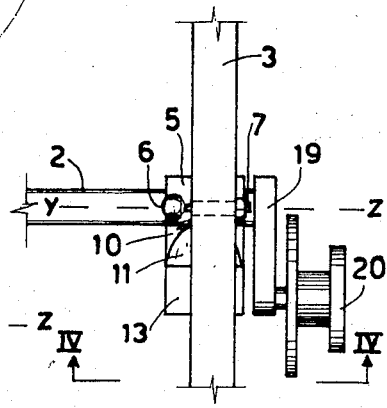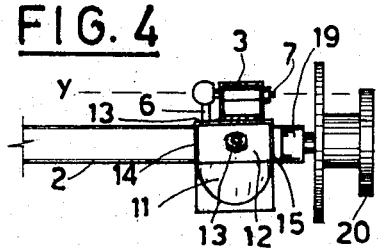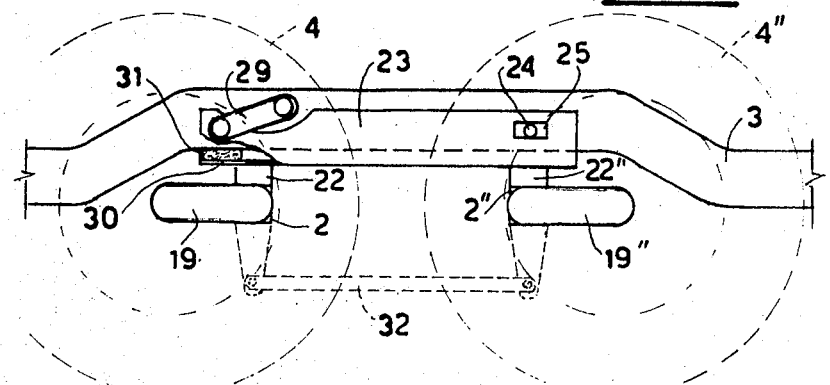

SUSPENSION SYSTEMS

BACKGROUND OF THE INVENTION

This invention concerns the suspension systems of trailed vehicles. A trailed vehicle having at least one beam axle, leading or trailing arm members one at each end of the one or more beam axles, resilient means associated with the arm members to elastically control arm movements independently and wheels mounted on the arm members for rotation has hitherto had the axles rigidly mounted to the vehicle chassis or body. The wheels therefore remain parallel to the chassis or body and perpendicular to the axle under conditions of bump load deflection or roll. It has been found that if the body rolls, the wheel that is subject to positive roll, i.e., the one that is subject to the greater load and lies closer to the vehicle chassis or body than is normal, assumes increased positive chamber relative to the road surface, thus reducing the wheel adhesion and resulting in lateral instability of the towed vehicle and undesirable transverse forces on the towing vehicle. When a wheel of the conventional suspension system is under bump load, a backward pull on the chassis is exerted at that side resulting in a lateral force on the towing coupling.

SUMMARY OF THE INVENTION

The main object of the invention was to provide a suspension system for a vehicle with a steering effect to offset the undesirable effects mentioned above. A secondary object was to provide a "bolt-on" beam axle suspension unit of the torsion type with leading or trailing arms, particularly a rubber torsion suspension unit utilising this principle. Where the words 'torsion suspension' are used or implied in this Specification and the Claims, they include not only the type of torsion suspension unit where springing is provided by material subjected to shear forces, but also the type of rubber suspension described more fully in the body of the Specification where the individual rubber springs may be considered to be more in compression than shear. In both cases torsional forces are imposed on the axle.

The present invention in a first aspect consists in beam axle suspension unit for a vehicle comprising a beam axle with torsional resilience, leading or trailing arm members, one at each end of the axle, to which the wheels are rotatably attached in use, resilient means associated with the arm members to elastically control arm movements and imposing a torsional reaction on the axle, means enabling attachment of the axle to each side of the vehicle chassis or body for pivotal movement about the transverse axis so located that under bump or positive roll conditions when an arm member on one side and the chassis or body move closer together, reactionary rotation of the axle caused at that side results in its forward movement at that side and a consequent steering of the wheels, and resilient means interposed between the axle and the chassis or body in use to elastically control axle movement about the transverse axis.

In a second aspect, the present invention consists in a trailed vehicle having at least one beam axle, leading or trailing arm members, one at each end of each one or more beam axles, resilient means associated with the arm members to elastically control arm movements and means resiliently mounting the one or more beam axles to the chassis or body at each side so that in bump or positive roll conditions when a wheel or wheels on one side and the body or chassis move closer together, forward movement of the one or more axles at that side results.

BRIEF DESCRIPTION OF THE DRAWINGS

One preferred form of the present invention will be described with reference to the accompanying drawings in which:

FIG. 1 shows an outward-looking cross sectional view through a beam axle with rubber type torsion suspension, just inboard of the right hand (on) side chassis member, FIG. 2 shows a cross section through an axle with a rubber type torsion suspension, FIG. 3 shows a plan view of the opposite (left hand) chassis member and axle end to that shown in FIG. 1, FIG. 4 shows a cross sectional view in the direction IV – IV indicated on FIG. 3, FIG. 5 shows a side elevation of a suspension where there are two beam axles with torsion suspension in tandem with provision for load sharing between them.

DETAILED DESCRIPTION OF THE INVENTION

Figure 6:
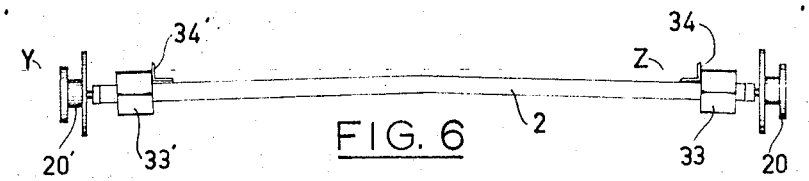
FIG. 6 shows a side elevation of a preferred form of "bolt-on" suspension unit.

Referring first of all to FIGS. 1 and 2, FIG. 1 shows an outward-looking cross sectional view through a beam axle 2 just inboard of the right hand (on) side chassis member 3', the wheel 4' being shown in dotted outline, and the leading arm member being omitted for clarity. (In the drawings, components of the right hand side suspension shown in FIG. 1 which are identical with similarly numbered components in the left hand side suspension shown in FIGS. 3 and 4 are suffixed with a dash.) The beam axle 2 is formed from a square section tube and is suitably constructed, in a manner which will be described later, to have torsional resilience. The axle is welded to a horizontal plate 5' to which, just inboard of the chassis member 3', there is welded an arm 6' of a ball joint. The other arm 7'(not shown) of the ball joint is bolted to the chassis member 3' as can be seen from FIGS. 3 and 4 where the arm is identified by reference 7. Thus the plate 5' and the ball joint arms 6' and 7' form means enabling attachment of the axle to each side of the vehicle chassis or body for pivotal movement about a transverse axis which is indicated by the dotted line Y-Z in FIGS. 3 and 4. To the horizontal plate 5' and to the axle 2, there are welded spaced apart vertical plates of which only one, labelled 9', shows in FIG. 1. These two vertical plates are substantially L-shaped and their leading edges are bevelled at about 45° to support a pressure plate 10' which is welded between them. This pressure plate 10' serves to support one end of a resilient rubber spring 11' which is bolted (or bonded) to the pressure plate 10' at one end and at the other end to a pressure plate 12'. The spring must be able to elastically control both compressive and tensile forces on it. The nut securing the upper end of the spring 11 to the upper pressure plate 12 can be seen in the left hand unit shown in FIG. 4. Pressure plate 12' forms part of an upper mounting bracket having a horizontal plate 13' (not shown) which is welded or bolted to the chassis 3' and which also has side plates 14' and 15' (not shown) to provide adequate support and means of attachment to the chassis for the upper pressure plate 12'.

From what has been said so far, it will be appreciated that movement of the axle 2 about the transverse axis Y-Z at the right hand side must take place against the resilience of the rubber spring 11' which thus controls the forward movement of the axle causing compression of the rubber spring and backward movement of the axle causing stretching of the spring.

The axle 2 is provided with leading or trailing arm independent suspension at both ends, leading arm suspension being shown in FIGS. 1, 3 and 4. The suspension is of the torsion type so that movement of the arm member 19 (FIGS. 3 and 4) which has a hub assembly 20 attached to it to mount the wheel 4 (not shown), causes a torsional force or couple to be applied to the axle 2. In the rubber torsion suspension shown, each arm member 19 is attached to a square section stub 21 (FIG. 2) which is arranged so that its faces are substantially perpendicular to the diagonals of the axle tube 2 within which the stub fits. The stub 21 projects into the end of the axle 2 a distance dictated by the load which the axle has to carry. The triangular spaces between the stub and the axle 2 are filled with rubber 17 which is thus subjected primarily to compressive forces when relative twisting occurs between the stub 21 and the axle 2. The rubber may be moulded in place or may be in the form of inserts, originally round rubber rods but compressed to a triangular form and frozen to enable them to be inserted in place. As can be seen from FIG. 2, if the stub 21 is rotated slightly in a clockwise direction, it tends to impart a clockwise turning force to the axle 2.

In normal suspensions the axle 2 is rigidly bolted to the chassis 3 but as has been explained in one embodiment of this invention, the axle is free to pivot about the transverse axis Y-Z which lies above the axle centre line in the case of a leading arm suspension (and must lie below it in the case of a trailing arm suspension). Thus as the chassis 3 and arm member 19 move closer to one another, such as under positive roll conditions (the term 'positive' being used to distinguish the arm member on such a side from the opposite arm member in this Specification and the Claims which will be spoken of as being in 'negative' roll conditions) the axle moves forwardly at that side and backwards at the other. In bump conditions when one wheel only is affected, only one end of the axle 2 is subjected to the torsional force causing it to rotate about the transverse axis Y-Z and thus to move forwardly in the direction of motion of the vehicle. Thus it will be seen that as the axle at one end is virtually stationary where one wheel is in bump conditions while at the other end it has moved forwards slightly, a slight steering effect is imparted to the wheels in a direction which tends to offset the normal reaction which would be caused by the displacing force. Thus consider a caravan being towed by a car, for example, when the left hand wheel of the caravan strikes a bump. This would normally tend to impart a transverse force on the car tow bar in the left hand direction. However, with this invention, the left hand end of the axle would move forwardly against the resilience of the rubber spring 11 which would impart a force to the chassis on the left hand side tending to swing the caravan draw bar transversely to the right. Thus the effect of the bump on the towing vehicle is able to be minimised and possibly eliminated. Considering the same towed vehicle in roll conditions, where the left hand side was in positive roll, it will be apparent again that the left hand end of the axle moves forwardly and since the right hand end of the axle is in negative roll, it moves backwardly, pivoting about the transverse axis Y-Z against the tensile restraining force exerted through the chassis via the rubber spring 11'. Thus the steered effect is double that obtained for corresponding single arm displacement in bump conditions. Again the steered effect tends to direct the chassis or body in the opposite direction to that in which it is being forced by the conditions causing the roll, such as centrifugal force or perhaps wind force. This leads to enhanced stability of the trailed vehicle and consequently of the towing vehicle and minimises or possibly eliminates undesirable draw bar reactions of the towed vehicle on the towing vehicle.

Further embodiments of the invention will now be described with reference to the remaining Figures where corresponding numerals have been used where possible to indicate corresponding components. Use has been made of double dashes " after references where necessary to show a slight distinction. In FIG. 5, two beam axle suspensions of the torsion type are shown in tandem. The wheels 4 and 4" are indicated in dotted outline. Arm member 19 is a leading arm member and 19" is a trailing arm member. The axles 2 and 2" are fastened in this case via packings 22 and 22" to a rigid channel member 23 which straddles the underneath of the chassis member 3. A pin 24 passes through the chassis 3 and through slots 25 (only one shown) in the side flanges of the channel member 23. Thus the rear of the channel member 23 is located for height but is able to slide backwards and forwards with relation to the chassis 3. The front of the channel member 23, which is shown partly cut away, is connected by shackles 29, one on either side, to the chassis (only one shown). Between the base 30 of the channel and the underside of the chassis 3, there is secured a block of resilient rubber 31 or some other spring. The connection must be such that both compressive and tensile forces between the channel 23 and the chassis 3 are elastically controlled by the rubber. Some form of load sharing device 32 (dotted) enables load sharing between the two wheels. As will be appreciated, when one or both of the wheels 4, 4" is in bump or positive roll conditions, there is a compressive force exerted on the rubber block 31 and the channel member 23 moves forwardly since it is controlled in its upward motion at the forward end by the shackles 29 and is constrained to move in an arcuate path. Again it will be seen that both axles 2 and 2" move forwardly to provide the desired steered effect under bump or positive roll conditions although in this case the axles do not yield to the torsional forces imposed upon them by the leading and trailing arm members 19 and 19". This embodiment of the invention is, of course, applicable only to tandem arrangements where load sharing is required. Where load sharing is not required, it is possible simply to double up two axles able to pivot in the manner described with reference to FIGS. 1, 3 and 4.

Figures 7, 8:
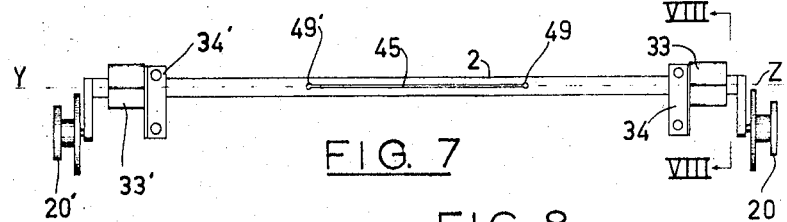
FIG. 7 shows a plan view of the axle of FIG. 6.
FIG. 8 shows a cross sectional view in the direction VIII — VIII of FIG. 7 of a preferred "bolt-on" suspension unit.
Figure 9:
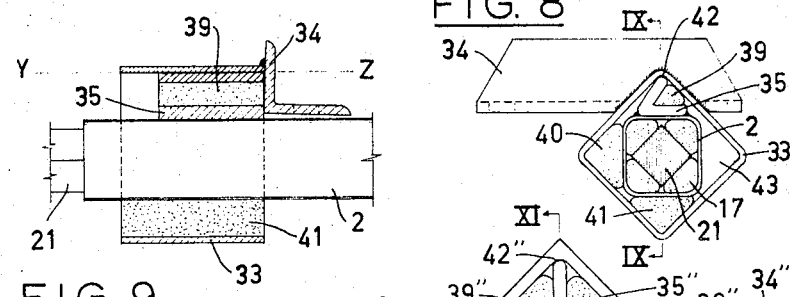
FIG. 9 shows a cross sectional view in the plane IX — IX indicated on FIG. 8.

The remaining Figures show two preferred forms of mounting the axle for pivoting about the transverse axis Y-Z. At each side of the axle at or adjacent the ends, the axle 2 is surrounded by square sectioned box members 33 and 33' forming part of means enabling attachment of the axle to each side of the vehicle chassis 3 (not shown). Each box member 33 is welded to angle bracket 34 which may be bolted to the underside of the chassis. The weight of the chassis is imparted to the axle 2 through the bracket 34, the box member 33 and a thrust member 35 which is substantially V-shaped in cross section as shown in FIGS. 8 and 9. The thrust member 35 is welded to the upper horizontal face of axle 2 and its length is determined by the load which the axle must bear. A certain amount of the compressive loading of the chassis on the axle is also born by the rubber member 39 which may be provided by a round rubber rod which has been compressed to an appropriate shape and frozen to enable it to be inserted during assembly. The function of the rubber spring 11 of FIGS. 1, 3 and 4 is performed by the rubber rods 40 and 41. As can be seen, the faces of the square axle tube 2 are perpendicular to the diagonals of the square box member 33 and thus when the axle tends to rotate clockwise, that is when the leading arm member attached to stub 21 is in a bump or positive roll position, the axle tends to pivot about the innermost upper corner edge 42 against the compressive resilience of the rubber rods 40 and 41, particularly 40. The rolling action of rod 41 controls anti-clockwise movement. If desired, a further rubber rod can be inserted in the triangular space 43.

Figure 10:
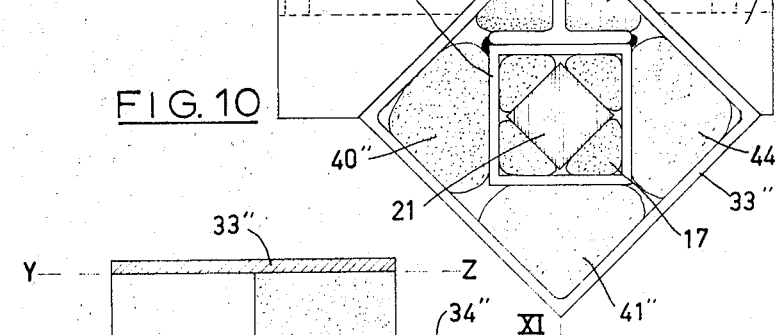
FIG. 10 shows a cross sectional view in the plane similar to VIII — VIII of FIG. 7 of an alternative "bolt-on" suspension unit and FIG. 11 shows a cross sectional view in the plane XI — XI indicated in FIG. 10.
Figure 11:
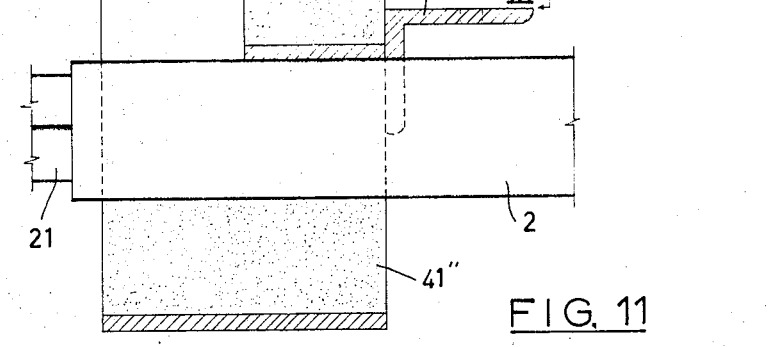

An alternative box type pivot arrangement is shown in FIGS. 10 and 11 and as can be seen, the main difference is that the thrust member 35" is T-shaped in cross section and is provided on either side with rubber rods 39" to bear part of the compressive load and minimise wear at the upper corner edge 42 of the box member and the mating edge of the thrust member 35". Also as can be seen from FIG. 10, a rubber rod 44 fills the triangular void 43, shown open in FIG. 8, to restrain rearward movement of the axle under an anti-clockwise turning couple.

It now remains only to describe the means of ensuring that the axle has torsional resilience so that the two halves at least may rotate the slight amount required independently of each other. As can be seen from FIG. 7, this may be achieved by slotting the upper and lower horizontal faces of the axle 2 in the manner shown by slot 45. The ends 49 of the slot are preferably radiused to prevent cracks developing. An alternative means of providing the necessary torsional resilience between the two axle halves is to butt two axle halves together at the centre and to join them with a stub insert in the manner of stub 21 with suitable rubber springing in the manner of rubber rods 17 to allow relative torsional movements of each half of the axle.

As will be appreciated, the amount of the forward movement of the axle which will be desirable in any case, is determined by several factors, among them the track width of the trailed vehicle, since the forward movement of the axle at any side must increase as the track width increases to give the same angular steered effect, the distance of the axle from the towing coupling, and so forth. By and large the correct amount of steer will be determined empirically for any particular vehicle. Likewise the rubber resiliences, length and so on which will be necessary to provide adequate control of forward axle movement, will vary depending on the stiffness of the primary suspension, the location of the transverse pivot axis Y-Z and so forth. It has been found, however, that with suitable steering characteristics, a remarkably better towing performance of the trailed vehicle results, making considerably higher towing speeds possible with safety than has previously been the practice and improving the stability of the trailed vehicle at all speeds and road conditions. It is therefore hoped that this invention will play its part in increasing safety on the roads.

I claim:

1. A beam axle suspension unit for a vehicle comprising a beam axle with torsional resilience, arm members, one at each end of the axle, to which the wheels are rotatably attached in use with the wheel axis offset from the axle axis, primary resilient means associated with the arm members to elastically control arm movements and imposing a torsional reaction on the axle, means enabling attachment of the axle to each side of the vehicle chassis for pivotal movement about a transverse axis so located that under conditions when an arm member on one side and the chassis move closer together, reactionary rotation of the axle caused at that side results in its forward movement at that side and a consequent steering of the wheels, and secondary resilient means interposed between the axle and the chassis in use to elastically control axle movement about the transverse axis.

2. A beam axle suspension unit as claimed in Claim 1 wherein said unit has leading arm members, the transverse pivot axis lies above the axle centre line in use, the means enabling pivotal attachment of the axle to each side of the vehicle are ball joints and the secondary resilient means interposed between the axle and the chassis comprises a rubber block.

3. A beam axle suspension unit as claimed in claim 1 wherein the beam axle is surrounded by a rectangular sectioned box member at each side at the ends, forming part of said means enabling attachment of the axle to each side of the vehicle chassis for pivotal movement about a transverse axis, said box member is arranged with a diagonal substantially vertical, said axle is rectangular sectioned where enclosed by the box member, a thrust member attached to the flat upper surface of the axle which is arranged to be horizontal bears against an innermost upper corner edge of said box member and said secondary resilient means interposed between the axle and the chassis in use to elastically control axle movement about the transverse axis is rubber located between adjacent portions of the axle and the box portions on either side.

4. A beam axle suspension unit as claimed in claim 3 wherein the primary resilient means associated with the arm members to elastically control arm movement, is rubber subjected to a compressive force between a portion of the axle which is rectangular in cross section and a portion of the arm member which lies within the axle which is also of rectangular section and lies with its diagonals substantially at 45° angles to those of the rectangular portion of the axle member.

5. A beam axle suspension unit as claimed in claim 4 wherein the torsional resilience of the beam axle is achieved by having a square tubular beam axle suitably slotted on top and bottom horizontal sides at the centre.

6. A beam axle suspension unit as claimed in claim 4 wherein the beam axle is provided in two halves meeting at the centre with a coupling allowing relative torsional movement of each half.

7. A beam axle suspension unit as claimed in claim 6 wherein the axle is a square tube and the coupling comprises an inner square section member whose faces are substantially perpendicular to the diagonals of the axle member and rubber located in the triangular spaces and subjected to compressive forces on relative rotation of the inner member and an axle half.

8. A trailed vehicle having at least one beam axle, arm members, one at each end of each beam axle, resilient means associated with the arm members to elastically control arm movements and secondary means resiliently mounting the at least one beam axle to the chassis at each side so that in conditions when at least one wheel on one side and the chassis move closer together, substantial forward movement of the at least one axle at that side results with consequent steering of the wheel.

9. A trailed vehicle as claimed in claim 8 wherein two beam axles are provided in tandem with load sharing coupling between their arm members and the secondary means resiliently mounting the axles to the chassis includes a rigid member at each side to which the axles are attached, so fastened to the chassis as to move forwardly in the direction of trailed motion against said resilience when at least one wheel on the same side moves closer to the chassis.

10. A trailed vehicle as claimed in claim 9 wherein the rigid member is located at the rear to the chassis by a coupling allowing sliding movement in the direction of trailed motion and the front of the rigid member is constrained by a shackle to move forwardly as it moves upwardly.

11. A trailed vehicle as claimed in claim 8 wherein there is one beam axle with torsional resilience and the primary resilient means associated with the arm members to elastically control arm movements impose a torsional reaction on the axle while the means enabling attachment of the axle to each side of the vehicle chassis enable pivotal movement about a transverse axis so located that under conditions when an arm member on one side and the chassis move closer together, reactionary rotation of the axle caused at that side results in its forward movement at that side and a consequent steering of the wheels, and the secondary means resiliently mounting the axle to the chassis at each side elastically control axle movement about the transverse axis.

12. A trailed vehicle as claimed in claim 11 wherein the arm members are leading arm members, the transverse pivot axis lies above the axle centre line in use, the means enabling pivotal attachment of the axle to each side of the vehicle are ball joints and the secondary resilient means interposed between the axle and the chassis comprises a rubber block.

13. A trailed vehicle as claimed in claim 11 wherein the beam axle is surrounded by a rectangular sectioned box member at each side at the ends forming part of said means enabling attachment of the axle to each side of the vehicle chassis for pivotal movement about a transverse axis, said box member is arranged with a diagonal substantially vertical, said axle is rectangular sectioned where enclosed by the box member, a thrust member attached to the flat upper surface of the axle which is arranged to be horizontal bears against an innermost upper corner edge of said box member and said secondary resilient means interposed between the axle and the chassis in use to elastically control axle movement about the transverse axis is rubber located between adjacent portions of the axle and the box portions on either side.

14. A trailed vehicle as claimed in claim 13 wherein the primary resilient means associated with the arm members to elastically control arm movement, is rubber subjected to a compressive force between a portion of the axle which is rectangular in cross section and a portion of the arm member which lies within the axle which is also of rectangular section and lies with its diagonals substantially at 45° angles to those of the rectangular portion of the axle.

15. A trailed vehicle as claimed in claim 14 wherein the torsional resilience of the beam axle is achieved by having a square tubular beam axle suitably slotted on top and bottom horizontal sides at the centre.

16. A trailed vehicle as claimed in claim 14 wherein the beam axle is provided in two halves meeting at the centre with a coupling allowing relative torsional movement of each half.

17. A trailed vehicle as claimed in claim 16 wherein the axle is a square tube and the coupling comprises an inner square section member whose faces are substantially perpendicular to the diagonals of the axle member and rubber located in the triangular spaces and subjected to compressive forces on relative rotation of the inner member and an axle half.

* * * * *